Feb. 8, 1966    N. J. QUARVE    3,233,489
METHOD OF SPLICING FILM AND DEVICE THEREFOR
Filed March 29, 1962    4 Sheets-Sheet 1

INVENTOR
Norman J. Quarve

BY  *Clive H. Bramson*
ATTORNEY

Feb. 8, 1966      N. J. QUARVE      3,233,489
METHOD OF SPLICING FILM AND DEVICE THEREFOR
Filed March 29, 1962      4 Sheets-Sheet 2
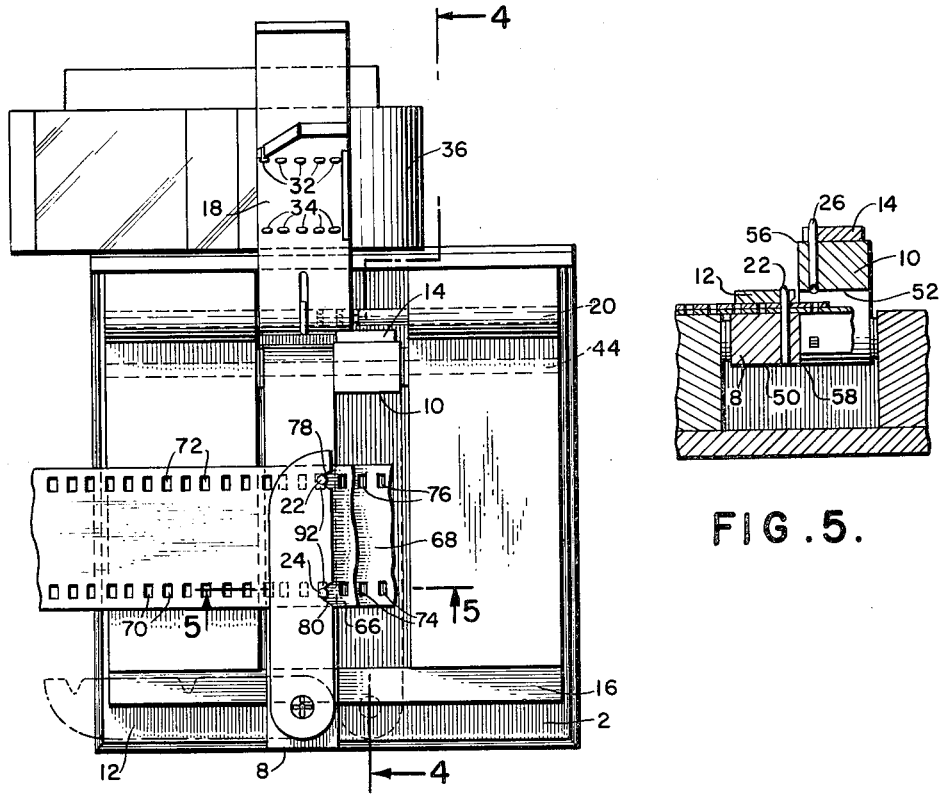
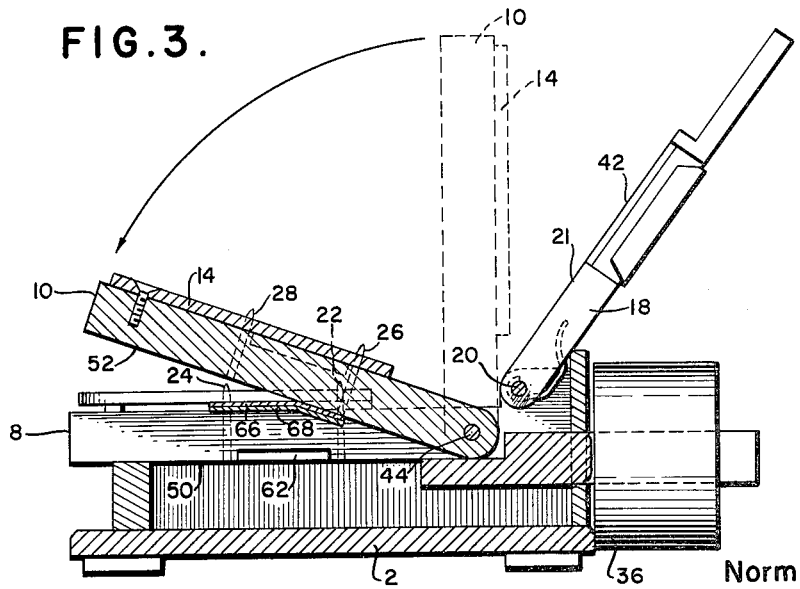
INVENTOR
Norman J. Quarve
BY Clive H. Bramson
ATTORNEY

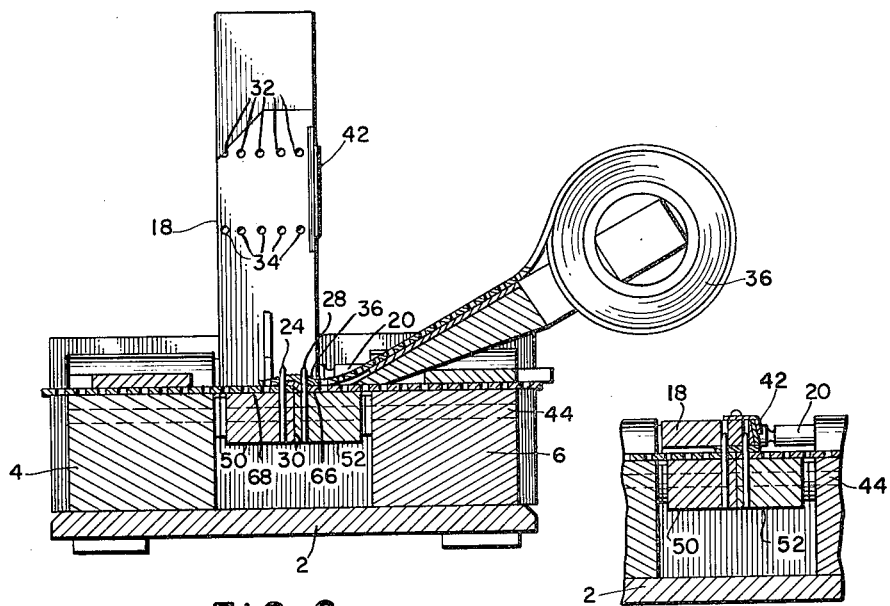
FIG.6.
FIG.7.
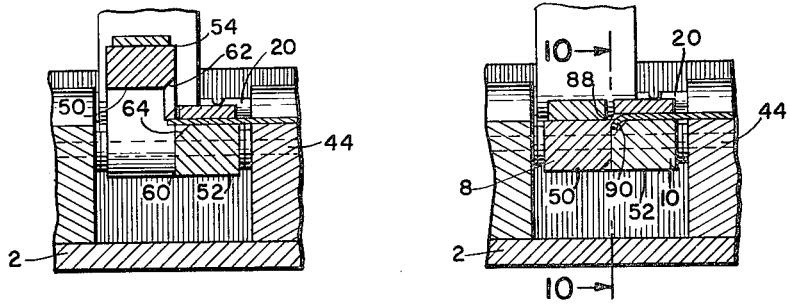
FIG.8.
FIG.9.
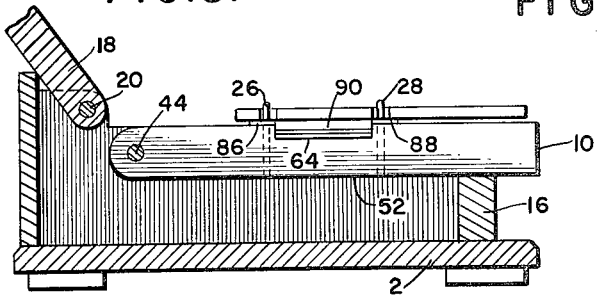
FIG.10.
INVENTOR
Norman J. Quarve Feb. 8, 1966  N. J. QUARVE  3,233,489
METHOD OF SPLICING FILM AND DEVICE THEREFOR
Filed March 29, 1962  4 Sheets-Sheet 4

INVENTOR
Norman J. Quarve

BY Clive H. Bramson
ATTORNEY

United States Patent Office 3,233,489
Patented Feb. 8, 1966

3,233,489
METHOD OF SPLICING FILM AND
DEVICE THEREFOR
Norman J. Quarve, 3066 S. Buchanan St.,
Arlington, Va.
Filed Mar. 29, 1962, Ser. No. 183,532
12 Claims. (Cl. 83—456)

This invention relates in general to film splicing devices employed in joining sections of motion picture film or the like and in particular to a splicing device capable of producing various types of splices in accordance with the desire of the user.

As is well known, the splicing of film may be accomplished by either the butt or the overlap joint, the former being effectuated by joining sections to be spliced in longitudinal edge to edge relation, the latter by slightly overlapping the longitudinal end of one film section with respect to the longitudinal end of the film section to be secured thereto, and by mutually bonding the film sections either through cement and/or transparent tape media.

The present invention is concerned with providing a novel device readily suited to the ends of splicing film sections according to the aforementioned methods, and which is additionally suited to the end of facilitating the accomplishment of a combined butt-splice and overlap-splice, the structure of the invention, the modes of operation and the advantages and features thereof to be fully described hereinbelow following.

Consonant with the foregoing, the instant invention has for an object the provision of a film splicing device capable of producing either butt or overlap splices and more significantly of producing splices embodying the combined features of both butt and overlap splices.

Another object of the present invention is to provide operational methods with respect to the manners of creating splices of the above character in conjunction with the instant device.

A further object of the present invention is the provision of a device whereby the application of transparent tape to ends of film section to be joined is readily accomplished.

A still further object of the instant invention is to provide means for facilitating shearing of transparent tape subsequent to the application thereof to film sections to be spliced, said means being adjustable with respect to the length of transparent tape desired at the spliced region.

Another general object of the present invention resides in the provision of a splicing device of the foregoing type, said device being simple, relatively inexpensive to produce, and reliable over prolonged periods of use.

Other objects and advantages of the invention will become apparent upon reading the following description taken in conjunction with the accompanying drawings in which:

FIGURE 3 is a plan view of the device, lengths of superposed film sections being positioned upon the left film support element in preparation for simultaneous shearing;

FIGURE 4 is a side elevational view of the device taken on line 4—4 of FIGURE 3;

FIGURE 5 is a front elevational view of the device taken along line 5—5 of FIGURE 3;

FIGURE 6 is a sectional front elevation view of the device and transparent tape dispenser wherein tape is being applied to join lengths of film section in overlapped relation;

FIGURE 7 is a fragmentary sectional front elevation view showing the pressure arm disposed contiguously with respect to sheared tape and overlapped spliced film sections;

FIGURE 8 is a fragmentary sectional front elevation of the splicing device wherein a length of film is being sheared in preparation of a combined butt and overlapped splice;

FIGURE 9 is the view of FIGURE 8, the shearing operation having been completed;

FIGURE 10 is a side elevational view taken along line 10—10 of FIGURE 9;

It will be understood that the foregoing general objectives and the following detailed description as well are exemplary and explanatory but are not restrictive of the invention.

Figure 1:
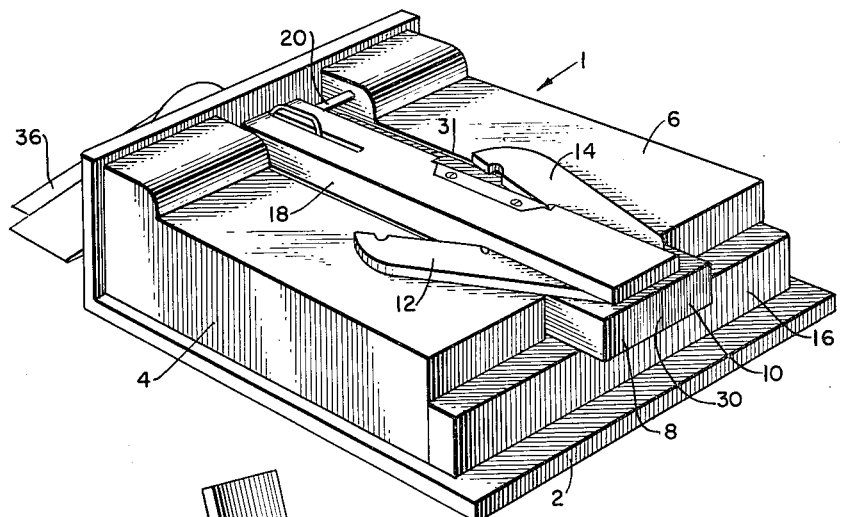
FIGURE 1 is a perspective view of the preferred embodiment of the film splicing device shown in the inoperative position.
Figure 2:
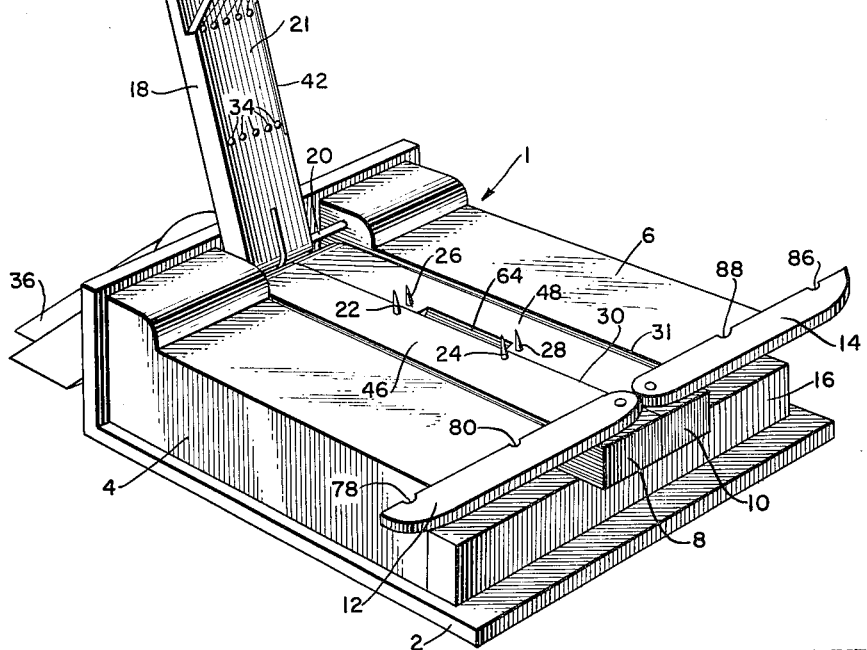
FIGURE 2 is a perspective view of the film splicing device, illustrating the flat table surface and the flat pressure surface of the upwardly pivoted pressure arm.

Referring to the drawings, FIGURES 1 and 2 perspectively illustrate the preferred embodiment of the instant film splicing device which is designated generally by numeral 1, and is seen comprised of a base member 2, left and right film support platform elements 4 and 6, respectively, left and right pivotal combined film shearing and support elements 8 and 10, respectively, clamping plates 12, 14, pivotally connected to said left and right combined film shearing and support elements, a stop bar 16 adapted to arrest downward movement of said film shearing and support elements beyond the surfaces of said film support platform elements so as to hold the top surfaces of the shearing elements in the same plane as the top surface of the platform elements, and a pressure arm 18 which is pivotally and slidably mounted upon bearing pin 20 and thus adjustably positionable between said left and right film support platform elements, the flat surface 21 thereof being adapted for pressing against said combined film shearing and support elements.

As is well known, motion picture film has one or two rows of sprocket perforations located along one or both longitudinal sides thereof. Locating pins 22, 24, 26 and 28 are suitably fixed on the film shearing elements 8 and 10 to fit in certain of the sprocket perforations to maintain the film sections in proper alignment with each other. For purposes to be described hereinbelow, locating pins 22 and 24 are located more distantly with respect to shearing line 30 than are locating pins 26 and 28 with respect thereto. Rows of holes 32, 34 are positioned within said flat surface 21 to register with said locating pins to thus permit uniform contiguity between said flat surface and a portion of the flat table surface formed by said combined film shearing and support elements.

With reference to FIGURE 6 of the drawings, transparent tape or film patching material 36 is seen being dispensed from a dispenser which is normally removably receivable within said splicing device as observed in FIGURES 3 and 4. Subsequent to positioning the tape 36 in superposed relation to film sections 66 and 68, pressure arm 18 is swung downwardly, thereby placing shearing edge 42, which is flush with said flat surface 21, firmly against the said transparent tape, thus enabling the excess tape remaining on the dispenser to be sheared away by a simple tearing action accomplishable by virtue of said edge 42. Variation of the length of tape utilized in a splice and hence the number of film sprocket perforations superposed by splicing tape is readily adjustable by sliding said pressure arm upon said bearing pin 20, suitable pairs of holes 32, 34 being conveniently registerable with said pairs of locating pins, thus obviating interference with the pressure and shearing function of arm 18, notwithstanding the position of said pressure arm.

Attention is now directed to the shearing relationship provided between said left and right pivotal film support elements 8 and 10 respectively and the mode of cooperable operation therebetween thereby affording the three types of film-splices, i.e., butt, overlap and combined butt and overlap. It will be observed that said film support and shearing elements 8 and 10 are substantially rectangular of configuration in the preferred embodiment and are mutually pivotable upon bearing rod 44, said bearing rod being anchored within said support platforms 4 and 6. It will be further noted that elements 8 and 10 are provided with upper surfaces 46 and 48, respectively and lower surfaces 50 and 52, respectively, shearing edges 54 and 56 being provided edgewise of said respective upper surfaces, shearing edges 58 and 60 being provided edgewise of said respective lower surfaces, shearing edges 54 and 60 and shearing edges 56 and 58 being in respective shearing relation.

With reference to FIGURES 4 and 8, it will be appreciated that shearing edge 58, so designated in FIGURE 5, is chamfered at 62, the region lying between the spread of locating pins 22, 24, the shearing edge edgewise of said lower surface 50 having thus been removed in the region between said locating pins. Similarly, reference to FIGURES 2, 8 and 10 discloses shearing edge 56, so designated in FIGURE 5, as chamfered at 64, the region lying between the spread of locating pins 26, 28, the shearing edge edgewise of said upper surface 48 having thus been removed in the region between said locating pins. Thus, it will be understood, that shearing action between shearing edges 54, 60 will be complete along the entire transverse edge of the film section being sheared, the shearing action between shearing edges 56, 58 being accomplished only in the region of the film adjacent the sprocket perforations, there being no shearing action in the region of the motion picture by reason of the chamfered portions provided upon said shearing edges.

MODE OF OPERATION

The functions of the respective elements of the present invention will be understandable from the description already given. However, the operation and methods of applying the apparatus will herein be described.

Figures 11, 12, 13:
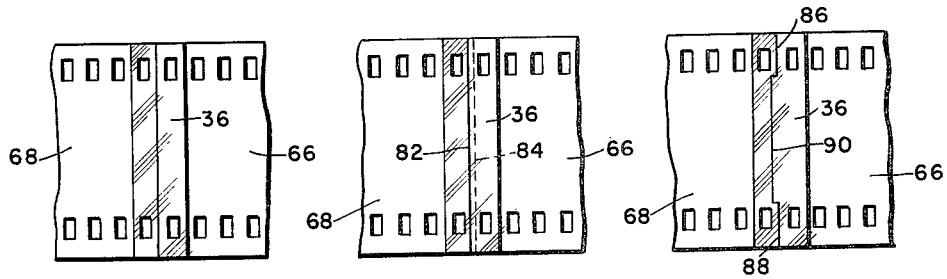
FIGURE 11 is a plan view of a completed butt-splice.
FIGURE 12 is a plan view of a completed overlap-splice.
FIGURE 13 is a plan view of a completed combined butt and overlap-splice.

FIGURES 11, 12 and 13, illustrate the three splice patterns capable of execution employing the instrumentalities provided by the instant invention; i.e., butt, overlap and combination butt and overlap, respectively. In procedural terms, film sections 66 and 68 to be spliced are arranged in superposed relation upon left film support and shearing element 8, respective sprocket perforations 70, 72 and 74, 76 being aligned upon locating pins 22, 24 projecting upwardly of said shearing element (see FIGURE 3). The film sections are securely held against said shearing element 8 by clamping plate 12 having notches 78, 80 therein for affording snugness between film sections and shearing edge 54 by dint of the achievement of clamping pressure adjacently of said shearing edge. Right support and shearing element 10 swung upwardly as shown in broken line illustration in FIGURE 4, is swung downwardly as shown in FIGURES 4 and 5, shearing edges 54 and 60 interacting to transversely and simultaneously cut said film sections 66 and 68 as shown. Upper cut film section 66 is then removed and repositioned over the upper surface 48 and aligned within locating pins 26, 28, the sprocket perforations adjacent the newly cut edge being in registry with said locating pins. As heretofore mentioned, locating pins 22, 24 are more closely spaced with respect to the shearing line 30 than are locating pins 26, 28. Consequently upon repositioning said upper section 66, the edge 82 thereof will overlap edge 84 of said film section 68 and will therefore result in an overlap splice when secured with transparent tape as shown in FIGURE 12.

The achievement of a butt-splice joining said film sections 66 and 68 as shown in FIGURE 11 requires that said film sections be positioned in end-to-end overlapping relation upon locating pins 22 and 24, whereupon said section 68 is supported by upper surface 46 of left film support and shearing element 8, right film support and shearing element 10 being in the upwardly pivoted position as shown in broken line illustration in FIGURE 4. Accordinly, it will be appreciated that said film section 68 is held snugly to said surface 46 by clamping plate 12 while said film section 66 is supported only by right film support platform element 6. Subsequent to the aforedescribed positioning of said film sections, shearing element 10 is swung downwardly to thus transversely shear the respective ends of said film sections, said section 66 being deposited beneath said shearing element 10 and thereafter withdrawn through space 31 and repositioned upon surface 48 of said shearing element 10, the transversely sheared edge of film section 66 being aligned by locating pins 26 and 28, thus placing said transversely sheared edge of film section 66 in edge abutting relation with the transversely sheared edge of film section 68. While so aligned upon respective surfaces 46 and 48, a length of transparent tape is aligned over pairs of locating pins 22, 24, and 26, 28, and sheared by severing the patch length desired along shearing edge 42 of pressure arm 18. By virtue of flat surface 21 of pressure arm 18, the pressure exerted thereon during the tape severing operation will sufficiently affix the transparent tape to said film sections thus achieving the desired butt-splice.

In producing a splice of the combined butt and overlap type as illustrated in FIGURE 13 of the drawings, the initial procedural steps essentially parallel those employed in producing an entirely overlapping splice. The methods differ however, in that repositioned film section 66, while securely held against surface 48 by clamping plate 14, is further partially sheared by the interaction between shearing edges 56 and 58, film edge portions 86 and 88 being sheared as shown in FIGURES 9 and 10, the central film portion 90 being unaltered by reason of chamfered portions 62 and 64 of said shearing edges 56 and 58. Thereafter, the splice is completed through application of transparent tape as accomplished in bonding the aforedescribed butt and overlap splices.

It will be appreciated that each of the above splice types is further strengthened by applying patch tape material to the reverse as well as the obverse side of the junction of the splice.

Figure 14:
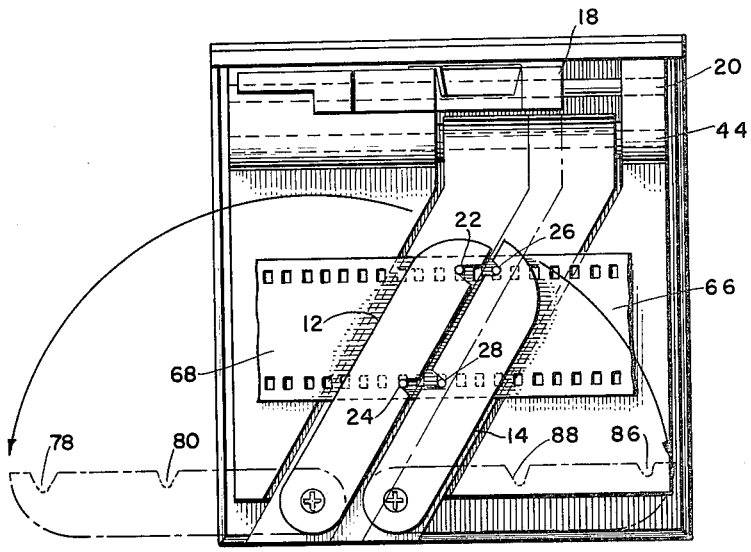
FIGURE 14 is a plan view of a modification of the device of the preferred embodiment wherein the effectuated splice is other than 90° with respect to the longitudinal axes of film sections to be spliced.

In splicing the ends of the film sections at an angle, the film support and shearing elements 8 and 10, locating pins 22, 24 and 26, 28, clamping plates 12 and 14 and presser arm 18 are arranged at an angle, as illustrated in the modification of the invention shown in FIGURE 14, the purpose of an angular splace being generally that of strength enhancement and more particularly to avoid the reproduction of objectionable sounds which may be produced by the spliced ends of sound film sections having their ends cut directly straight across the film.

It will be further appreciated that the present device will accommodate and splice both narrow and wide perforated 35 mm. motion picture film by virtue of the small dimension of the locating pins thus allowing spaces 92 to remain of the film sprocket perforation, these spaces being required in the event wider film is to be treated. Single track optical and four track magnetic as well as other films or tapes may be suitably joined by the device and methods above disclosed.

The perforated tapes useful in the invention may consist of a base of any strong transparent material such as Mylar and may further consist of the usual tacky adhesives useful for the pressure sensitive layer.

Changes may be made in the form, construction and arrangement of parts from that disclosed herein without in any way departing from the spirit of the invention or sacrificing any of the attendant advantages thereof, provided, however, that such changes fall within the scope of the claims appended hereto.

What is claimed is:

1. A film splicing device comprising the combination of a pair of parallel spaced film support platform elements, a pair of pivoted combined film shearing and support elements to shear a pair of film sections, said combined film shearing and support elements cooperable with said platform elements to form a flat table surface, means on said combined film shearing and support elements for locating film sections to be spliced, and a pressure arm pivotally and slidably mounted above said pair of film support platform elements, said pressure arm having a flat surface, adapted for pressing against said combined film shearing and support elements.

2. A film splicing device comprising the combination of a pair of parallel spaced film support platform elements, a pair of pivoted combined film shearing and support elements to shear a pair of film sections, said combined film shearing and support elements cooperable with said platform elements to form a flat table surface, a plurality of film locating pins extending from said combined film shearing and support elements for locating said film sections in end to end relation, a pressure arm pivotally and slidably mounted between said pair of film support platform elements, said pressure arm having a flat surface adapted for pressing against said combined film shearing and support elements, and a plurality of holes positioned within said flat surface, said holes being adapted to register with said plurality of locating pins to thus permit uniform contiguity between said flat surface and a portion of said flat table surface formed by said combined film shearing and support elements.

3. A film splicing device comprising the combination of a pair of parallel spaced film support platform elements, a pair of pivoted combined film shearing and support elements to shear a pair of film sections, said combined film shearing and support elements cooperable with said platform elements to form a flat table surface, a plurality of film locating pins extending from said combined film shearing and support elements for locating said film sections in end to end relation, clamping plates pivotally connected to said combined film shearing and support elements and adapted to snugly press against said flat table surface, a pressure arm pivotally and slidably mounted between said pair of film support platform elements, said pressure arm having a flat surface adapted for pressing against said combined film shearing and support elements, and a plurality of holes positioned within said flat surface, said holes being adapted to register with said plurality of locating pins to thus permit uniform contiguity between said flat surface and a portion of said flat table surface formed by said combined film shearing and support elements.

4. A film splicing device comprising the combination of a pair of parallel spaced film support platform elements, a pair of pivoted combined film shearing and support elements to shear a pair of film sections, said combined film shearing and support elements cooperable with said platform elements to form a flat table surface, means on said combined film shearing and support elements for locating film sections to be spliced, a pressure arm pivotally and slidably mounted between said pair of film support platform elements, said pressure arm having a flat surface adapted for pressing against said combined film shearing and support elements and a cutting edge integral with and adjacent said flat surface, said cutting edge being disposed in the plane of said flat surface.

5. A film splicing device comprising the combination of left and right pivotal film support elements disposed in shearing relation, each of said support elements having an upper and a lower surface, shearing edges provided edgewise of said upper and lower surfaces, the shearing edge edgewise of said upper surface of said left support element being in shearing relation with respect to said shearing edge edgewise of said lower surface of said right support element, the shearing edge edgewise of said lower surface of said left support element being in shearing relation with respect to said shearing edge edgewise of said upper surface of said right support member.

6. A film splicing device comprising the combination of a base member, left and right pivotal film support elements disposed in shearing relation, each of said support elements having an upper and a lower surface, said support elements being cooperable to form a flat table surface, and a pressure arm pivotally mounted upon said base member, said pressure arm having a flat surface adapted for pressing against said flat table surface, said pressure arm being slidably adjustable for positioning with respect to said flat table surface, shearing edges provided integral with and edgewise of said upper and lower surfaces, the shearing edge edgewise of said upper surface of said left support element being in shearing relation with respect to said shearing edge edgewise of said lower surface of said right support element, and said pressure arm having a shearing edge edgewise of said flat surface.

7. A film splicing device comprising the combination of left and right pivotal film support elements disposed in shearing relation, each of said support elements being rectangular of configuration and having upper and lower surfaces, shearing edges provided edgewise of said upper and lower surfaces, the shearing edge edgewise of said upper surface of said left support element being in shearing relation with respect to said shearing edge edgewise of said lower surface of said right support element, the shearing edge edgewise of said lower surface of said left support element being in shearing relation with respect to said shearing edge edgewise of said upper surface of said right support member, a pair of locating pins projecting upwardly of each of said upper surfaces of said left and right film support elements and spacedly positioned adjacent said shearing edges provided edgewise of said respective upper surfaces, said pairs of locating pins being differentially spaced with respect to said shearing edges.

8. A film splicing device comprising the combination of a base member, left and right pivotal film support elements disposed in shearing relation, each of said support elements having an upper and a lower surface, said support elements being cooperable to form a flat table surface, a pressure arm pivotally mounted upon said base member, and a dispenser of film patching material removably receivable within said base member, said pressure arm having a flat surface adapted for pressing against said flat table surface, said pressure arm being slidably adjustable for positioning with respect to said flat table surface, shearing edges provided integral with and edgewise of said upper and lower surfaces, the shearing edge edgewise of said upper surface of said left support element being in shearing relation with respect to said shearing edge edgewise of said lower surface of said right support element, and said pressure arm having a shearing edge edgewise of said flat surface.

9. A film splicing device as claimed in claim 8 wherein said shearing edge edgewise of said flat surface of said pressure arm is flush with said flat surface.

10. A film splicing device comprising the combination of left and right pivotal film support elements disposed in shearing relation, each of said support elements having an upper and a lower surface, shearing edges provided edgewise of said upper and lower surfaces, a portion of said shearing edge edgewise of one of said upper surfaces being chamfered, and a portion of said shearing edge edgewise of one of said lower surfaces being chamfered.

11. A film splicing device comprising the combination of left and right pivotal film support elements disposed in shearing relation, each of said support elements having an upper and a lower surface, shearing edges provided edgewise of said upper and lower surfaces, respective pairs of locating pins projecting upwardly of each of said upper surfaces of said left and right film support elements and spacedly positioned adjacent said shearing edges provided edgewise of said respective upper surfaces, said pairs of locating pins being each differentially spaced with respect to said shearing edges, a portion of said shearing edge edgewise one of said upper surfaces being removed in the region between said locating pins positioned adjacent said shearing edge edgewise of said one of said upper surfaces.

12. A film splicing device comprising the combination of left and right pivotal film support elements disposed in shearing relation, each of said support elements having an upper and a lower surface, clamping plates adapted to pivotally slide across said upper surfaces, shearing edges provided edgewise of said upper and lower surfaces, each locating pin of a first pair of locating pins being spaced equidistantly of said shearing edges of said left support element, each locating pin of a second pair of locating pins being spaced equidistantly of said shearing edges of said right support element, said first and second pairs of locating pins being spaced differently with respect to their distances from their respective shearing edges.

References Cited by the Examiner

UNITED STATES PATENTS

| | | | |
|---|---|---|---|
| 1,727,349 | 9/1929 | Lyman | 88—19.5 |
| 2,318,287 | 5/1943 | Brolin | 88—19.5 |
| 2,346,874 | 4/1944 | Russell | 156—505 |
| 2,923,195 | 2/1960 | Reibel et al. | 156—502 |
| 3,053,711 | 9/1962 | Eagle et al. | 156—502 |
| 3,167,466 | 1/1965 | Lapersonne | 156—505 |

EARL M. BERGERT, *Primary Examiner.*

D. J. DRUMMOND, J. MATHEWS, *Assistant Examiners.*